(12) United States Patent  (10) Patent No.: US 7,530,540 B2
Long et al.  (45) Date of Patent: May 12, 2009

(54) UPRIGHT POST WITH MOUNTING COLLAR

(75) Inventors: Darren Long, Calgary (CA); Brian Gallant, Calgary (CA); Tom Brown, Calgary (CA)

(73) Assignee: Haworth, Ltd., Calgary, Alberta (CA)

( * ) Notice: Subject to any disclaimer, the term of this patent is extended or adjusted under 35 U.S.C. 154(b) by 526 days.

(21) Appl. No.: 11/304,393

(22) Filed: Dec. 15, 2005

(65) Prior Publication Data

US 2007/0137797 A1  Jun. 21, 2007

(51) Int. Cl.
*E04G 3/00* (2006.01)
*E04G 7/00* (2006.01)
*E04H 12/00* (2006.01)
*A47F 5/08* (2006.01)

(52) U.S. Cl. ............... 248/230.1; 52/655.1; 52/239; 52/282.5; 403/49; 403/235; 403/241; 248/219.1; 248/219.3

(58) Field of Classification Search ............... 52/655.1, 52/239, 282.4, 282.5; 403/49, 235, 241; 211/107, 205, 196; 160/371, 135; 248/230.1, 248/219.1, 219.3
See application file for complete search history.

(56) References Cited

U.S. PATENT DOCUMENTS

| | | | |
|---|---|---|---|
| 1,706,388 A | | 3/1929 | Ashkenas |
| 3,999,351 A | | 12/1976 | Rensch |
| 4,024,686 A | * | 5/1977 | Gronert ............... 52/761 |
| 4,128,064 A | * | 12/1978 | Chung et al. ............... 108/192 |
| 4,142,343 A | * | 3/1979 | Trafton ............... 248/219.1 |
| 4,273,463 A | * | 6/1981 | Dobersch ............... 403/246 |
| 4,439,052 A | * | 3/1984 | Wallther ............... 403/49 |
| 4,445,307 A | * | 5/1984 | Puccinelli et al. ............... 52/638 |
| 4,493,172 A | * | 1/1985 | Jones ............... 52/282.2 |
| 4,606,394 A | | 8/1986 | Bannister |
| 4,615,278 A | * | 10/1986 | Cabrelli ............... 108/192 |
| 4,628,660 A | * | 12/1986 | Kotzolt ............... 52/655.1 |
| 4,771,583 A | | 9/1988 | Ball et al. |
| 4,805,365 A | * | 2/1989 | Bastian ............... 52/282.2 |
| 4,831,791 A | | 5/1989 | Ball |
| 5,016,311 A | * | 5/1991 | Young et al. ............... 15/88.3 |
| 5,083,840 A | * | 1/1992 | Young et al. ............... 300/21 |
| 5,127,342 A | * | 7/1992 | Taylor ............... 108/147.13 |
| 5,150,554 A | | 9/1992 | Quinlan, Jr. et al. |
| 5,155,955 A | | 10/1992 | Ball et al. |
| 5,240,089 A | * | 8/1993 | Spera ............... 182/186.7 |
| 5,320,312 A | * | 6/1994 | Hoenninger ............... 248/68.1 |
| 5,390,803 A | * | 2/1995 | McAllister ............... 211/153 |
| 5,394,658 A | | 3/1995 | Schreiner et al. |
| 5,511,348 A | | 4/1996 | Cornell et al. |
| 5,540,017 A | * | 7/1996 | Eilam et al. ............... 52/118 |
| 5,575,580 A | * | 11/1996 | Parrish et al. ............... 403/49 |
| 5,606,919 A | | 3/1997 | Fox et al. |
| 5,641,075 A | * | 6/1997 | Mechlin ............... 211/26 |
| 5,724,778 A | | 3/1998 | Cornell et al. |
| 5,785,447 A | * | 7/1998 | Fonti et al. ............... 403/49 |
| 5,816,000 A | | 10/1998 | Izatt et al. |

(Continued)

*Primary Examiner*—Richard E Chilcot, Jr.
*Assistant Examiner*—Andrew J Triggs
(74) *Attorney, Agent, or Firm*—Flynn, Thiel, Boutell & Tanis, P.C.

(57) ABSTRACT

A structural post arrangement and cooperating clamp assembly positioning and supporting related furniture components, such as beams. The clamping assembly includes a split clamping collar which surrounds the post and defines upper and lower rims for engagement with top and bottom jaws as coupled to a furniture component.

18 Claims, 13 Drawing Sheets

U.S. PATENT DOCUMENTS

| | | | |
|---|---|---|---|
| 5,974,742 A | 11/1999 | Schreiner et al. | |
| 5,979,119 A * | 11/1999 | Trafton | 52/40 |
| 5,979,837 A | 11/1999 | Thorp | |
| 6,318,572 B1 * | 11/2001 | Lai | 211/196 |
| 6,322,277 B1 * | 11/2001 | Jennings | 403/49 |
| 6,374,548 B1 | 4/2002 | Ruedinger et al. | |
| 6,553,730 B1 * | 4/2003 | Mueller et al. | 52/220.5 |
| 6,554,235 B1 * | 4/2003 | Fortier | 248/122.1 |
| 6,575,652 B2 * | 6/2003 | Krauss | 403/49 |
| 6,837,016 B2 * | 1/2005 | Simmons et al. | 52/655.1 |
| 7,014,384 B2 * | 3/2006 | Nicoletti | 403/234 |
| 7,021,020 B2 * | 4/2006 | Simmons et al. | 52/656.9 |
| 2002/0011193 A1 * | 1/2002 | Beck et al. | 108/50.01 |
| 2002/0109070 A1 * | 8/2002 | McCracken | 249/219.1 |
| 2003/0041549 A1 * | 3/2003 | Simmons et al. | 52/655.1 |
| 2003/0194265 A1 * | 10/2003 | Krauss | 403/49 |

* cited by examiner

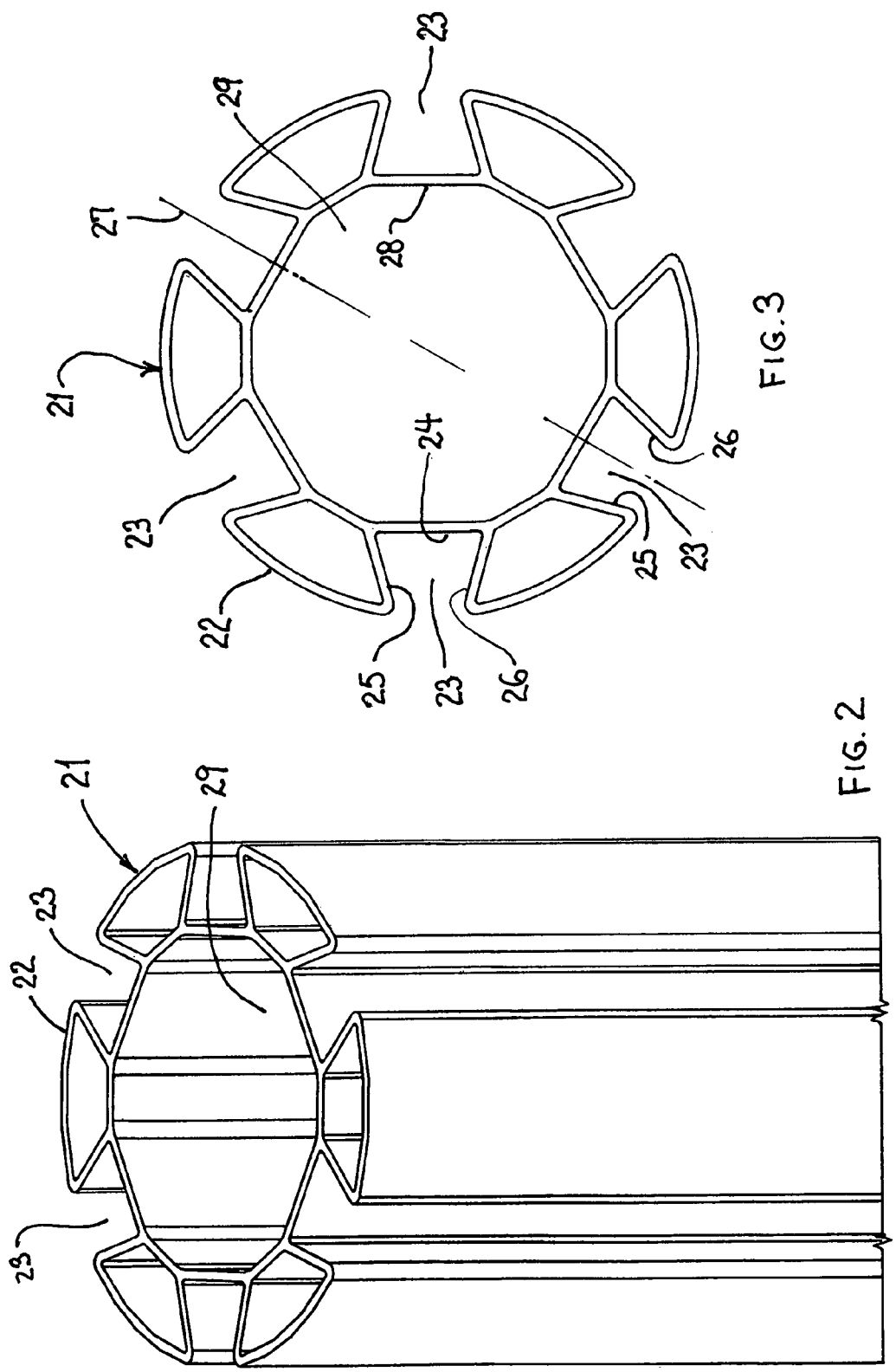

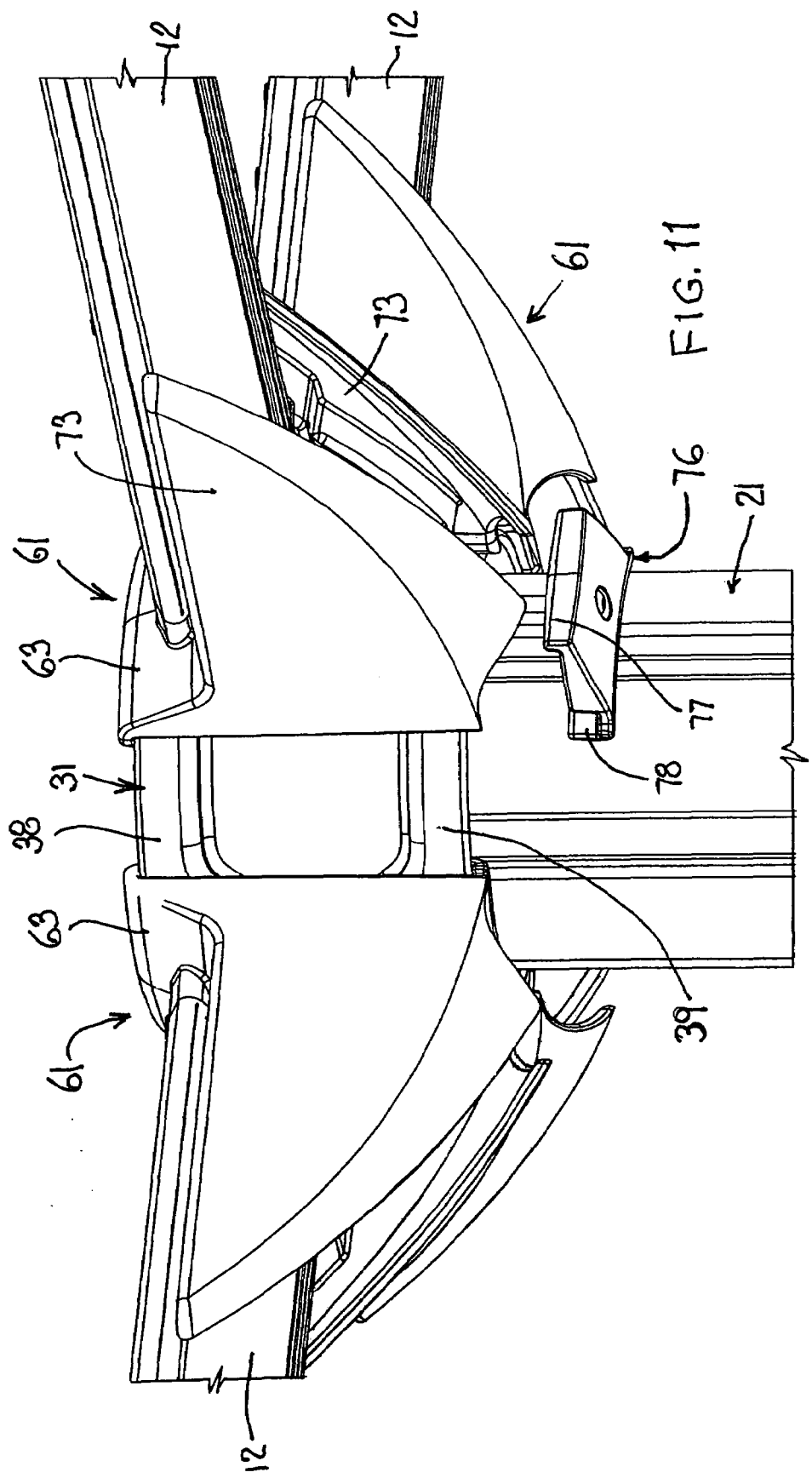

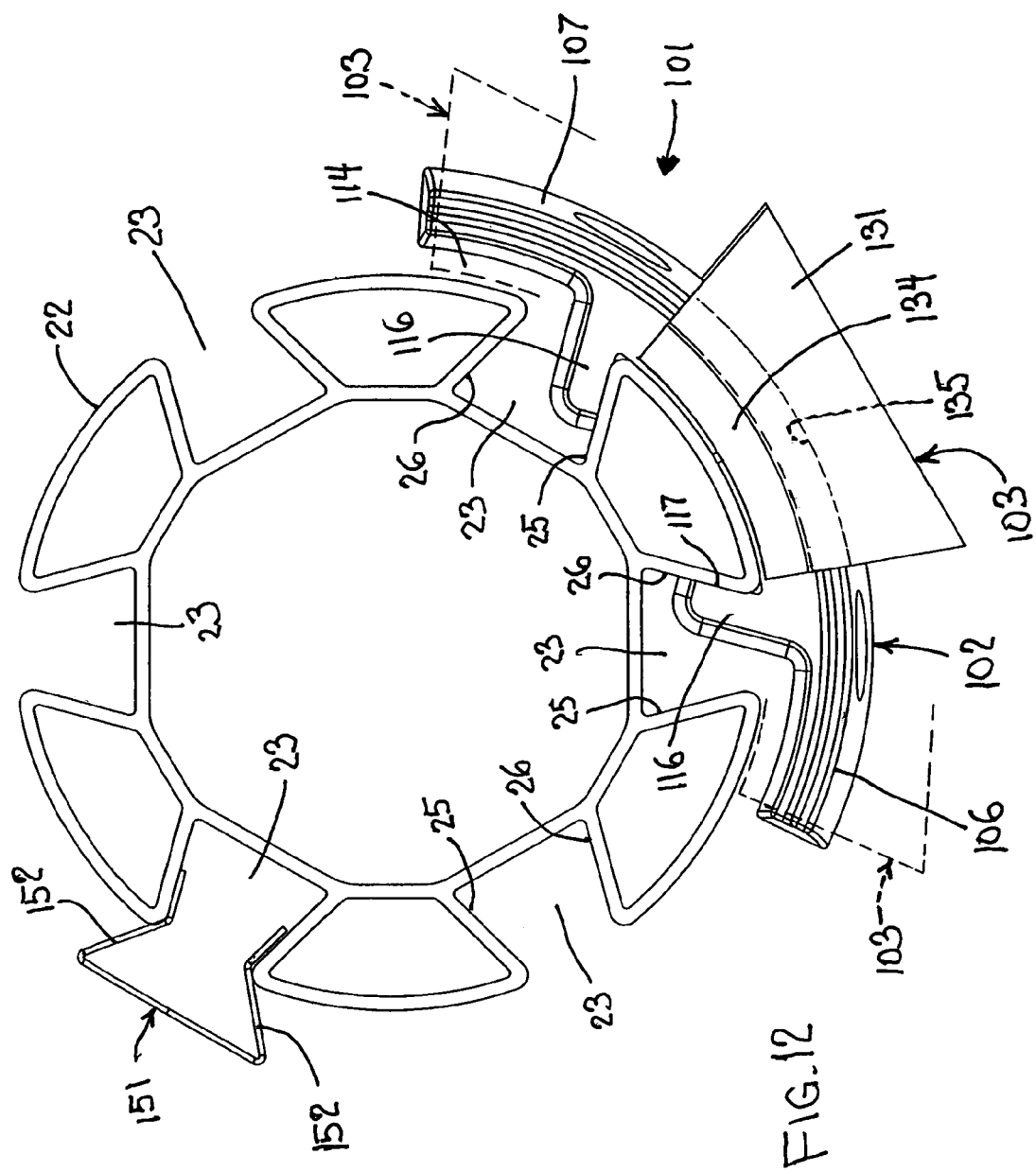

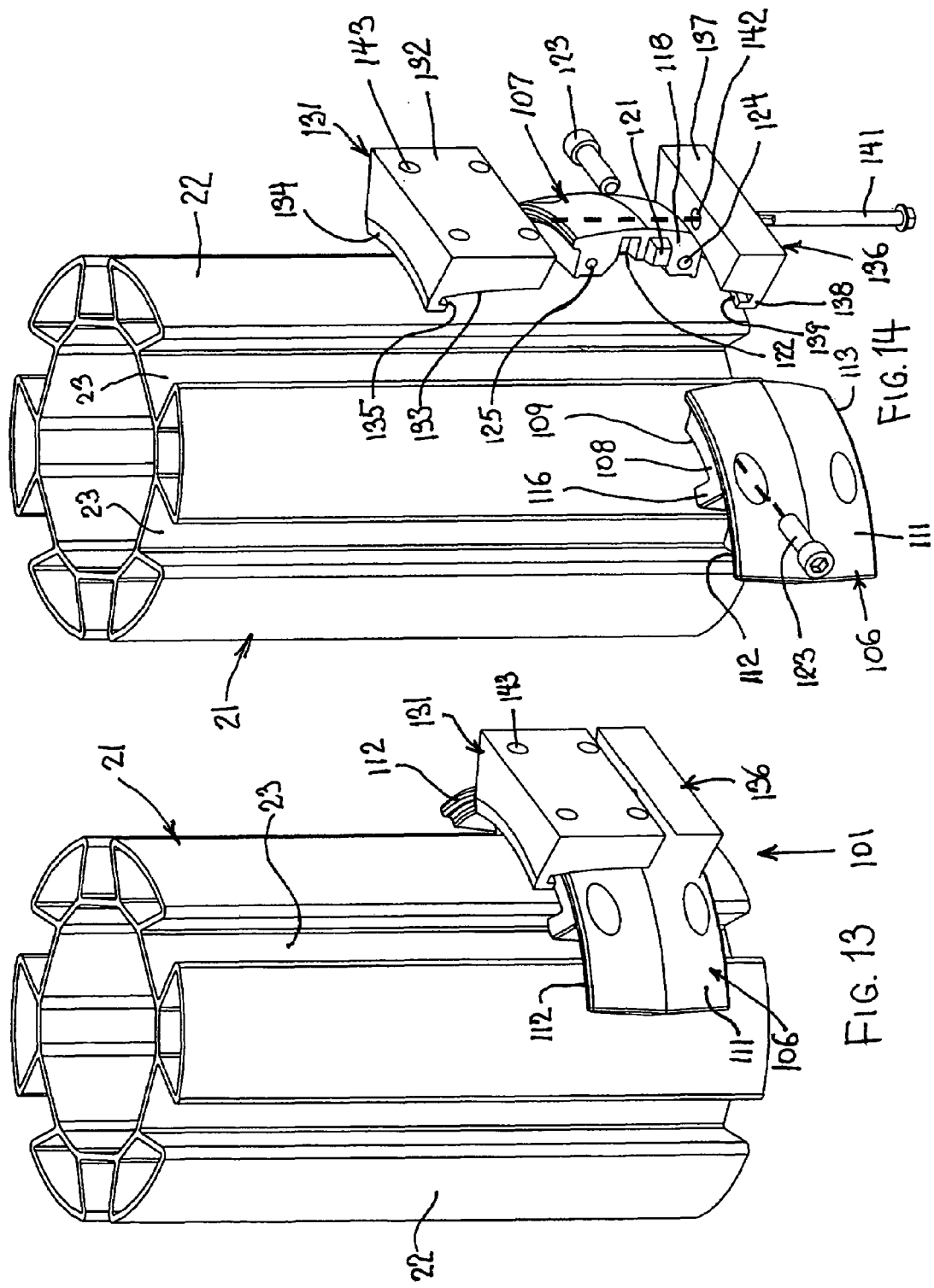

UPRIGHT POST WITH MOUNTING COLLAR

FIELD OF THE INVENTION

This invention relates to an improved structural post arrangement for use in conjunction with office furnishings, such as for assembling work stations in an office environment, and in particular to an improved post and connector structure which facilitates attachment of other components, such as horizontal beams, to an upright post in a manner which provides ease of assembly while permitting attachment at any desired axial or angular position relative to the post.

BACKGROUND OF THE INVENTION

Interior furnishing systems of the type used to define workspaces and the like within office environments have frequently utilized upright posts which bear on and project upwardly from a support such as a floor, with various structural or accessory members being attached to the post so as to project therefrom and define workspaces and related workspace accessories. Most of these known systems employing such upright posts have, however, possessed structure which has necessarily imposed restrictions with respect to the ability to flexibly mount beams or other components at substantially any desired location relative to the post. More specifically, most of the known post arrangements have utilized a connecting structure which has permitted other components such as beams to be mounted to the post only at predefined discrete angular intervals about the post, such angular intervals frequently being multiples of 15°. Many of the connections have also provided only limited height adjustability along the axial direction of the post, and such height adjustability typically has involved adjustability solely with respect to either discrete heights or discrete height intervals. These known systems thus impose positional restrictions on the manner in which office workspaces and/or accessories can be assembled, positioned and oriented.

It is an object of this invention to provide an improved structural post arrangement and cooperating clamp assembly which facilitates positioning of related components, such as beams and the like, by permitting such components to be easily and effectively assembled to the post, while at the same time permitting such assembly to take place in a manner whereby the positioning of the component is substantially unrestricted with respect to either its angular orientation about the post or its height position along the post. Discrete positioning of the component relative to the post, particularly angularly about the post, is thus avoided, thereby providing significantly increased flexibility with respect to positioning and orientating components which connect to the post.

According to the present invention, there is provided a vertically elongate post having a plurality of grooves or flutes formed therein in angularly spaced relationship, and extending axially of the post in generally parallel relationship. A clamping collar is attached to the post in surrounding relationship thereto at substantially any desired axial location therealong. The clamping collar is preferably defined by a pair of generally semi-cylindrical sleeve parts which can be opened or separated to permit their being fit around the post, with the sleeve parts being closed and secured to the post, as by fasteners which connect the two sleeve parts together for gripping engagement with the post. The clamping collar has upper and lower annular clamping rims which concentrically surround the post but are spaced radially therefrom by an intermediate annular groove. A furniture component such as a beam or the like is provided with a relatively movable clamping structure which engages the upper and lower clamping rims. This clamping structure includes a first or top jaw member which is fixed to the furniture component and has a hook configuration which opens downwardly, and is arcuate in plan view, so as to be engagable over the top rim of the clamp collar through a selected arcuate extent. A second or lower jaw member is movable relative to the top jaw member and in similar fashion engages the lower rim of the clamp collar, and is movable toward and fixedly connected relative to the upper jaw member to engage and create a fixed but releasable joinder with the top and bottom rims of the clamp collar. The engagement of the jaws with the upper and lower clamp collar rims, and the annular configuration of these rims, enables the clamping structure on the furniture component to be engaged with the clamp collar at any desired angular orientation around the post. Several such clamping structures, as associated with different furniture components, can be secured to the clamp collar at different angular orientations thereon.

According to the present invention, in a further variation thereof, a clamping arrangement defined by a pair of similar arcuate sectors are positioned adjacent the perimeter of the post and are provided with projections which protrude into a pair of flutes associated with the post so that, when the arcuate sectors are fastened together, such as by a threaded fastener, the pair of projections clampingly grip the post and the sectors extend circumferentially through a selected angular extent which is typically less than 90°. The coupled arcuate sectors define thereon upper and lower rim sectors which are concentric with but spaced radially outwardly from the post by intervening gaps or spaces. The rim sectors also extend through an angular extent around the periphery of the post which is typically less than 90°. A clamping structure associated with an accessory or furniture component is provided with top and bottom jaws which respectively engage over the upper and lower rim sectors, and which can be selectively angularly moved along the rim sectors to position the clamping structure at a desired angular relationship with respect to the post. One of the jaws, typically the lower jaw, is fixedly and clampingly moved toward the upper jaw to effect fixed clamping of the top and bottom jaws to the respective top and bottom rim sectors.

Other objects and purposes of the invention, including structural and functional advantages associated therewith, will be apparent to persons familiar with structures of this general type upon reading the following specification and inspecting the accompanying drawings.

BRIEF DESCRIPTION OF THE DRAWINGS

FIG. 2 is a perspective view illustrating the post as associated with the post assembly.

FIG. 3 is a plan view of the post shown in FIG. 2.

FIG. 11 is a perspective view which generally corresponds to FIG. 10 but shows the jaws engaged with the clamping collar mounted on the post.

FIG. 12 is a top view of the post and illustrating a modified clamping arrangement engaged therewith.

FIG. 13 is a perspective view which corresponds to FIG. 12 and shows the modified arrangement engaged on the post.

FIG. 14 is a perspective view corresponding to FIG. 13 but showing the clamping arrangement, and associated jaws, in a separated condition.

Figure 1:
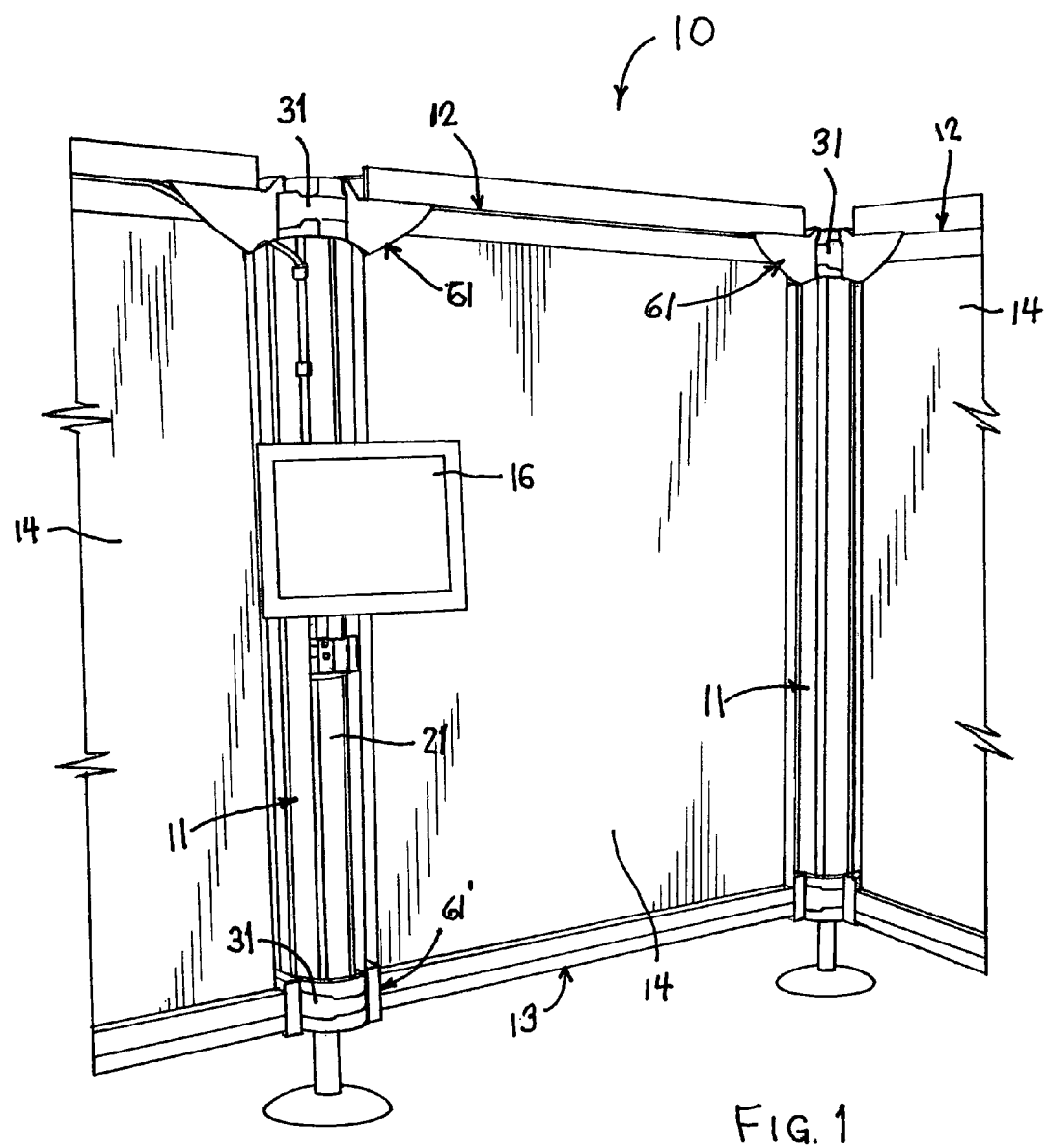
FIG. 1 is a fragmentary perspective view illustrating a furniture arrangement employing therein the improved post assembly of the present invention.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the post or designated parts associated therewith. Such terminology will include the words specifically mentioned, derivatives thereof, and words of similar import.

DETAILED DESCRIPTION

Referring to FIG. 1, there is illustrated a furniture or furnishings arrangement 10 intended for use in open interior regions, such as offices and the like, to permit larger regions to be at least partially subdivided into smaller regions or workspaces. The arrangement 10 incorporates the use of upright post assemblies 11 which are typically disposed for supportive engagement with a floor, and which are intended to permit other structures or components to be attached and supported thereon so as to function as furniture or furnishings for an adjacent workspace or region. In the arrangement illustrated by FIG. 1, the post assemblies 11 support thereon the ends of top and bottom beam assemblies 12 and 13, respectively, which span generally horizontally between an adjacent pair of upright post assemblies. The beams in the illustrated embodiment provide support for screens or panels 14 which extend vertically between the beams and generally horizontally between the adjacent vertical posts.

The post assemblies 11 also enable other components or accessories to be mounted thereon, and FIG. 1 illustrates an accessory 16, such as a flat panel video display or a white board or similar object, mounted on one of the posts merely as exemplary of the functionality provided by the present invention.

The post assembly 11, which in the embodiment illustrated by FIG. 1 is part of a post-and-beam space dividing arrangement, includes an elongate upright post 21 which at a lower end is supported on a suitable surface such as a floor, and for this purpose the lower end of the post can be provided with any type of conventional foot or glide. The post 21 in turn removably mounts thereon one or more mounting or connecting collars 31 which can be fixedly secured to the post in surrounding relationship thereto at substantially any axial location along the post. Two such collars 31 are secured to the post 21 in the FIG. 1 arrangement, with such collars being positioned generally adjacent upper and lower ends of the posts so as to define a system which generally corresponds to an upright panel or space-dividing curtain or wall arrangement.

The connecting collars 31 are provided for cooperative engagement with removable jaw assemblies 61 which in turn fixedly couple to a component associated with the arrangement 10, typically a load-bearing component such as one end of an elongate beam 12 or 13. The jaw arrangement 61 is adapted to be releasably but securely engagable with the connecting collar 31 at any location circumferentially around the central axis of the post, whereby the load-bearing element such as the beam 12 can be disposed at any desired angular orientation around the post as it projects radially outwardly therefrom. Further, the connecting collar 31 permits several such jaw assemblies 61 to be mounted thereon at any one time, such as typically up to at least four such jaw assemblies, to provide optimum flexibility with respect to the post assembly and the resulting arrangement with which it cooperates.

Considering initially the post 21, and referring to FIGS. 2 and 3, the post 21 is an elongate tube having a generally cylindrical outer peripheral wall 22 which is spaced radially outwardly from and concentrically surrounds an inner annular wall 28 which, as illustrated in FIG. 3, is defined by a plurality of joined straight segments which cause the wall to approximate a cylindrical configuration. This wall 28 may be cylindrical if desired.

The post 21 has a plurality of channel-like grooves or flutes 23 extending axially throughout the length thereof and generally parallel to the longitudinal axis of the post. These flutes 23, there being six such flutes in the illustrated embodiment, are preferably disposed in equal angular spacing around the periphery of the post.

The inner annual wall 28 of the post defines therein an interior passage 29 which extends lengthwise throughout the length of the post to permit power or communication cabling to be accommodated therein for feeding between locations disposed adjacent upper and lower ends thereof. The flutes 23 similarly define outwardly opening passages which extend vertically throughout the length of the post so as to permit cabling, such as communication cabling or low voltage electrical cabling, to be disposed therein so as to extend vertically of the post, as explained in greater detail hereinafter.

Figure 4:
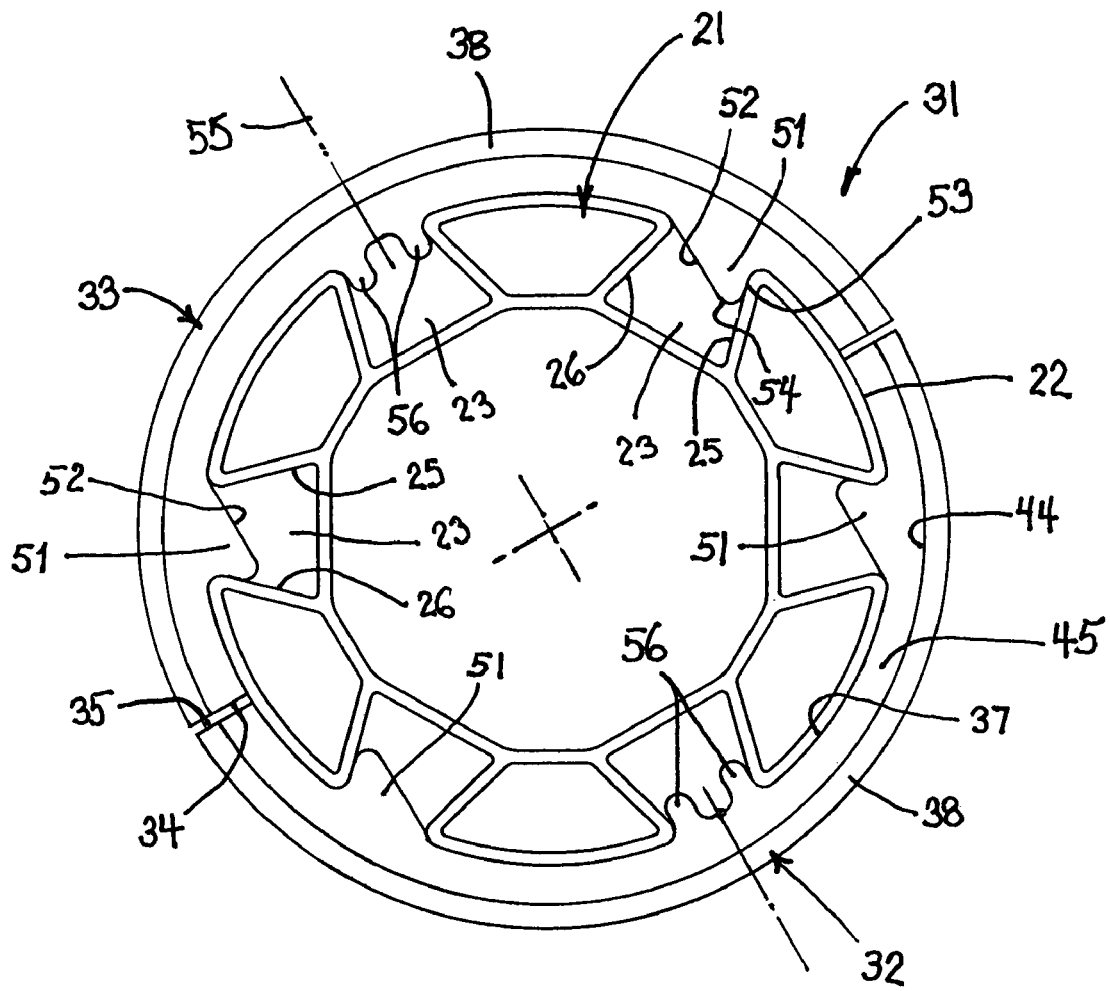
FIG. 4 is a plan view similar to FIG. 3 but illustrating a clamping collar mounted on the post in surrounding relationship thereto.
Figure 5:
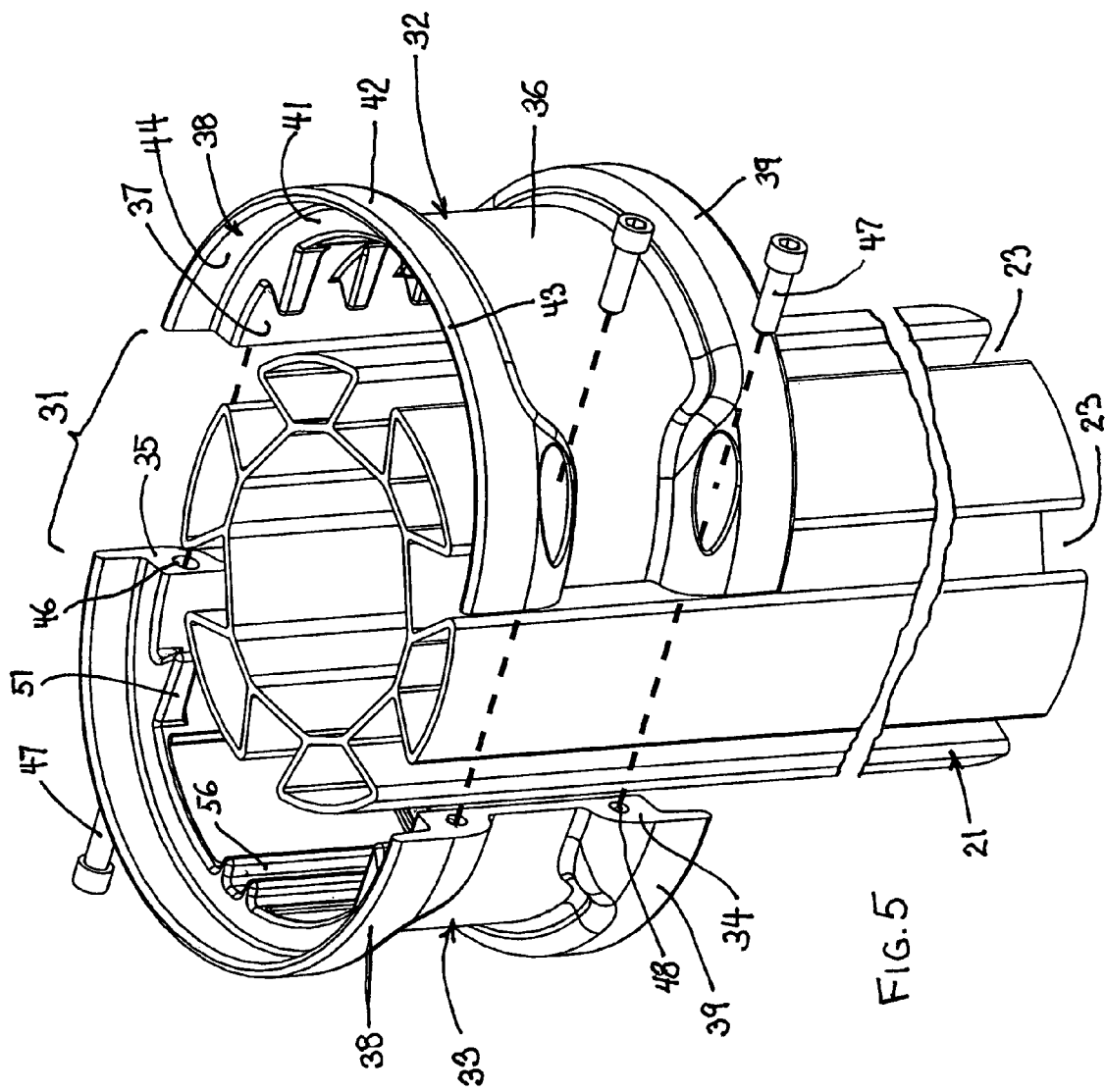
FIG. 5 is a fragmentary perspective view which illustrates the post and associated clamping collar in separated condition prior to assembly of the collar on the post.
Figure 6:
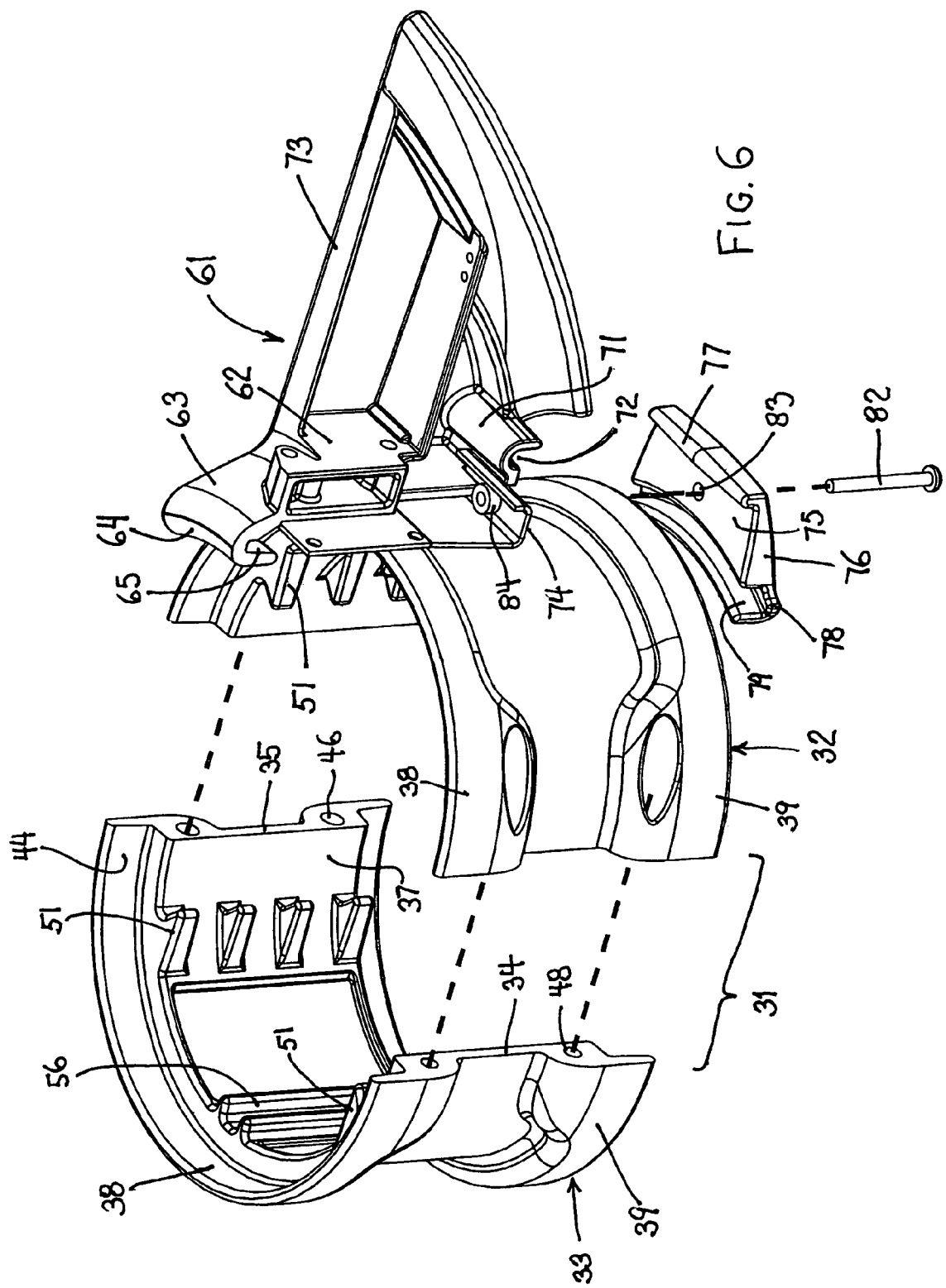
FIG. 6 is a perspective view which illustrates the clamping collar in separated condition, and further illustrating its cooperation with a jaw assembly.

The post 21 permits mounting of one or more connecting collars 31 thereon at any axial location therealong. The connecting collar 31, when fixedly mounted on the post, defines a generally closed ring which externally surrounds the post. The connecting collar 31, however, as illustrated by FIGS. 4-6, is of an openable or separable construction so that it can be mounted on, or removed from, the post 21 solely by moving the collar components radially relative to the post, thereby avoiding any required axial sliding of the collar onto or off of the post.

In the illustrated and preferred construction, the connecting collar 31 is defined by a pair of generally opposed collar parts 32 and 33 which, when coupled together, define a closed generally cylindrical ring or sleeve. The collar parts 32 and 33 are each preferably substantially semi-cylindrical, i.e. each extend through an angle which closely approximates 180°, and are preferably identical to one another so as to facilitate manufacture and assembly.

The collar part 32 includes a main arcuate wall part 36 which is generally semi-cylindrical in the preferred embodiment, and which at opposite ends of its arcuate extent terminates in generally flat end surfaces 34 and 35 which are coplanar with one another and disposed generally within an axial plane which extends parallel within and substantially includes the axis of the main wall part 36. This main wall part 36 defines thereon an inner wall surface 37 which is of a partially cylindrical construction generated on a radius which closely conforms to the radius defining the outer cylindrical periphery 22 of the post 21.

The main arcuate wall part 36 of collar part 32 also has arcuate top and bottom flange parts or rims 38 and 39, respectively, which extend throughout the full arcuate extent of the collar part and which project axially outwardly in opposite directions. Each of the top and bottom flange parts 38 and 39, as illustrated by the top flange part 38 in FIG. 5, has a transverse cross section which includes a base leg 41 which projects radially outwardly through a small extent, and which joins to an outer leg 42 which projects axially a limited extent so as to terminate at a free edge 43. This outer leg 42 defines thereon an inner generally semi-cylindrical surface 44 which is spaced radially outwardly from the main wall inner surface 37. The flange part 38 as well as the flange part 39 have a generally L-shaped configuration in cross section. This construction of the flange parts 38 and 39, when the pair of collar parts 32-33 are secured on and externally surround the post 21 as illustrated in FIG. 4, hence define a pair of annular grooves 45 which are defined radially between the post periphery 22 and the flange inner boundary wall 44, with these grooves 45 opening axially outwardly in opposite directions at the respective upper and lower ends of the connecting collar.

To secure the opposed collar parts 32-33 together in fixed engagement with one another, each collar part has a pair of generally parallel and vertically spaced openings 46 formed in one end thereof, which openings open through the end surface 35. A further pair of generally parallel and vertically spaced openings 48 are formed through the other end part of the collar part and open through the other end surface 34. These openings 48 can be internally threaded. A pair of fasteners 47, such as threaded screws, are provided for extension through the parallel openings 46 associated with each of the collar parts 32-33, with the screws 47 being threadably engaged into the openings 48 associated with the opposed end part of the other collar part 33 as illustrated by FIG. 5 so as to permit the opposed collar parts 32-33 to be snugly drawn toward one another, and hence into surrounding engagement with the post 21.

The proper seating and fixing of the connecting collar 31 to the post 21 is facilitated by the provision of keys or engaging projections associated with the collars 32-33. More specifically, as illustrated by FIGS. 4-6, each collar part 32-33 has a pair of keys or engaging projections 51 which protrude radially inwardly relative to the inner side wall 37 in the vicinity of the opposite ends of the arcuate main wall. Each of these keys or projections 51, when viewed in an axial direction, has a generally triangular shape defined by a pair of side surfaces 52 and 53 which protrude inwardly and terminate at a rounded free end or nose 54. The side surfaces 52 as defined on the pair of keys 51 are, as illustrated in FIG. 4, disposed in generally opposed and facing relationship, and also extend generally in parallel relationship. The other side surface 53 extends generally at an acute angle relative to the respective side surface 52, and in addition the side surfaces 53 as defined on the pair of keys 51 define planes which transversely and substantially perpendicularly intersect. The angularity of the planes defining the side surfaces 53 generally corresponds to the angular relationship defined by the side walls 25, 26 associated with the flutes in the post 21 so that the side surfaces 53 on the keys 21 can create a generally flat gripping engagement with the flute side walls 25-26 when the collar parts are mounted thereon as illustrated by FIG. 4.

Each collar part 32-33 also has a generally center key or projection 56 protruding radially inwardly from the inner surface 37 thereof. This latter key 56 is positioned so as to protrude radially inwardly in symmetrical relationship relative to a transverse center line 55 of the respective collar part 32-33, with the key having a transverse width which closely approximates the circumferential width of the mouth or opening into the flute 23 so that the key 56 hence substantially seats within the mouth when engaged with the post, as shown in FIG. 4.

As illustrated by FIG. 4, the mounting of the opposed collar parts 32-33 onto the post 21 is accomplished by sliding the center projections 52 into a pair of opposed flutes 23 formed on the post 21, and this is substantially simultaneously accompanied by the pair of sidewardly-spaced keys 51 on each collar part being slidably engaged into the pair of flutes 23 which are disposed on opposite sides of the flute engaged by the center projection 56. This is permitted by the sideward spacing between the generally parallel side surfaces 52 which enable the side keys 51 to effectively enter into the flutes which are angularly spaced on the post. When the collar parts 32-33 are drawn inwardly into snug engagement with the post due to tightening of the fasteners 47, the opposed surfaces on the post and collar part, such as opposed surfaces 22 and 37, or opposed surfaces on the keys and post, are drawn into tight frictional gripping contact with one another, which contact occurs at several large opposed contact areas. A rather large frictional force is thus generated which prevents slippage of the collar along the post, even when the collar is subjected to significant axial loading.

Figure 7:
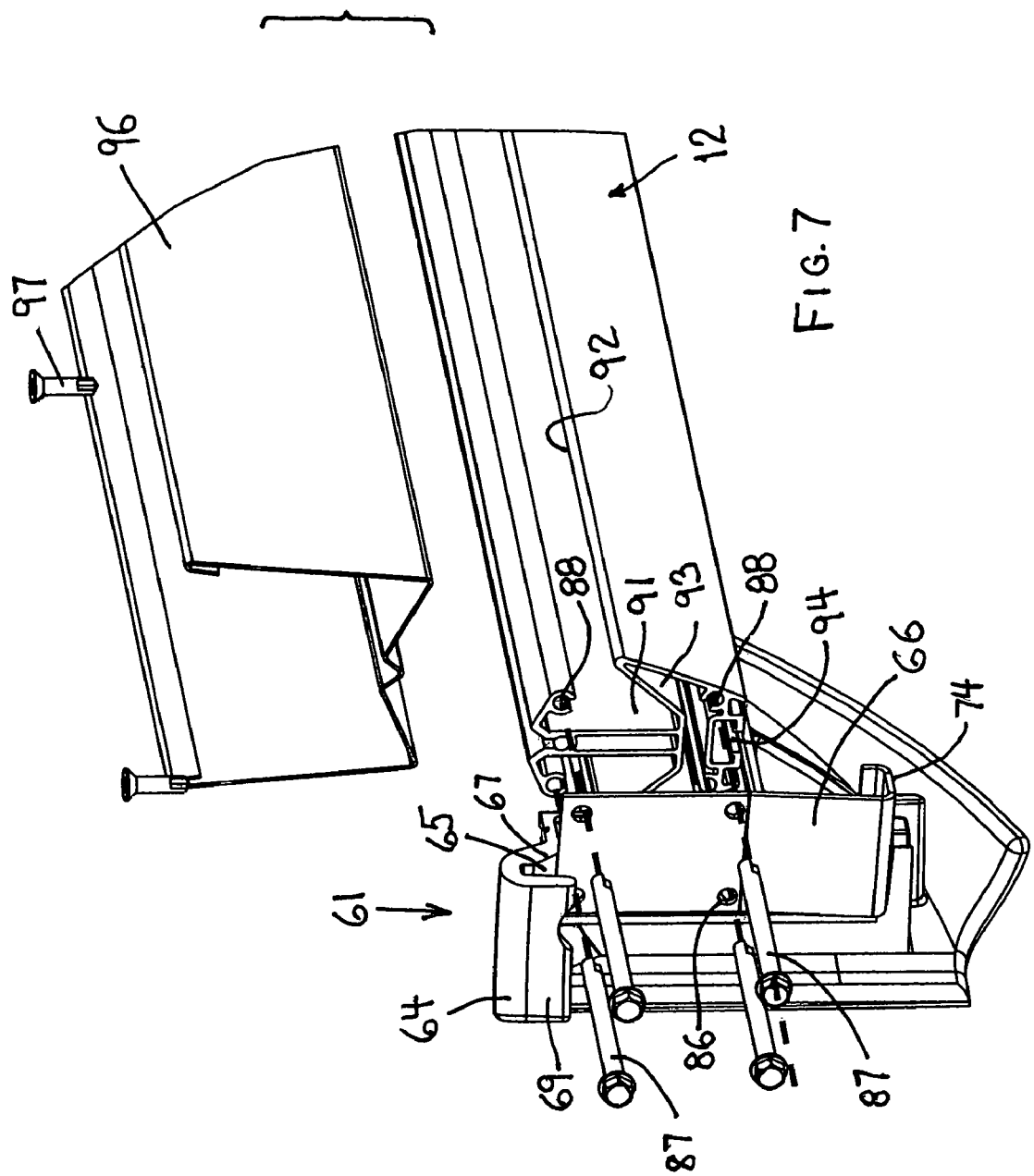
FIG. 7 illustrates the jaw assembly as associated with one end of an elongate beam.

Considering now the jaw assembly 61 which externally couples to the connecting collar 31, and referring to FIGS. 6-7, the jaw assembly 61 includes a main mounting body 62 which fixedly mounts a first jaw 63 thereon, which jaw is herein referred to as the top jaw. The top jaw 63 defines a jaw part 64 which is cantilevered inwardly beyond an exterior or front face 66 of the mounting body, and which defines therein a downwardly-opening gripping channel or groove 65 which is spaced inwardly from the mounting body front face 66. This gripping channel 65 is defined by a wall which, in cross section, is generally U-shaped with the width of the gripping channel being defined between a cantilevered outer leg 69 and an opposed side wall 67 which is sloped away from the outer leg 69 so that the width of the channel is flared or increased at the mouth to facilitate entry therein.

The jaw part 64, including the gripping channel 65 and the outer leg 69 associated therewith, have an elongated arcuate shape when viewed from above, with the elongate arcuate shape corresponding to the arcuate shape of the channel 65 corresponding to the arcuate shape defined by the free edge of the connecting collar flange 38 or 39 so that the axially projecting leg 42 of the flange 38 or 39 can be seated in the gripping channel 65.

The main mounting body 62 of the jaw assembly, as shown in FIG. 6, has a retainer part 71 fixedly provided adjacent the lower end thereof. This retainer part 71 is disposed rearwardly from the mounting body front face 66, and defines therein a generally horizontally elongated channel or groove 72 which extends transversely of the jaw part and opens in generally the same direction as the gripping channel 65, namely downwardly in the illustrated embodiment. The groove 72 is straight, although it could be of an arcuate configuration concentrically compatible with the arcuate configuration of the gripping channel 65 if desired. This retainer part 71 is disposed adjacent and rigidly joined relatively to a bottom wall 74 which is a part of the mounting body and which projects generally transversely outwardly away from the front face 66.

Figure 8:
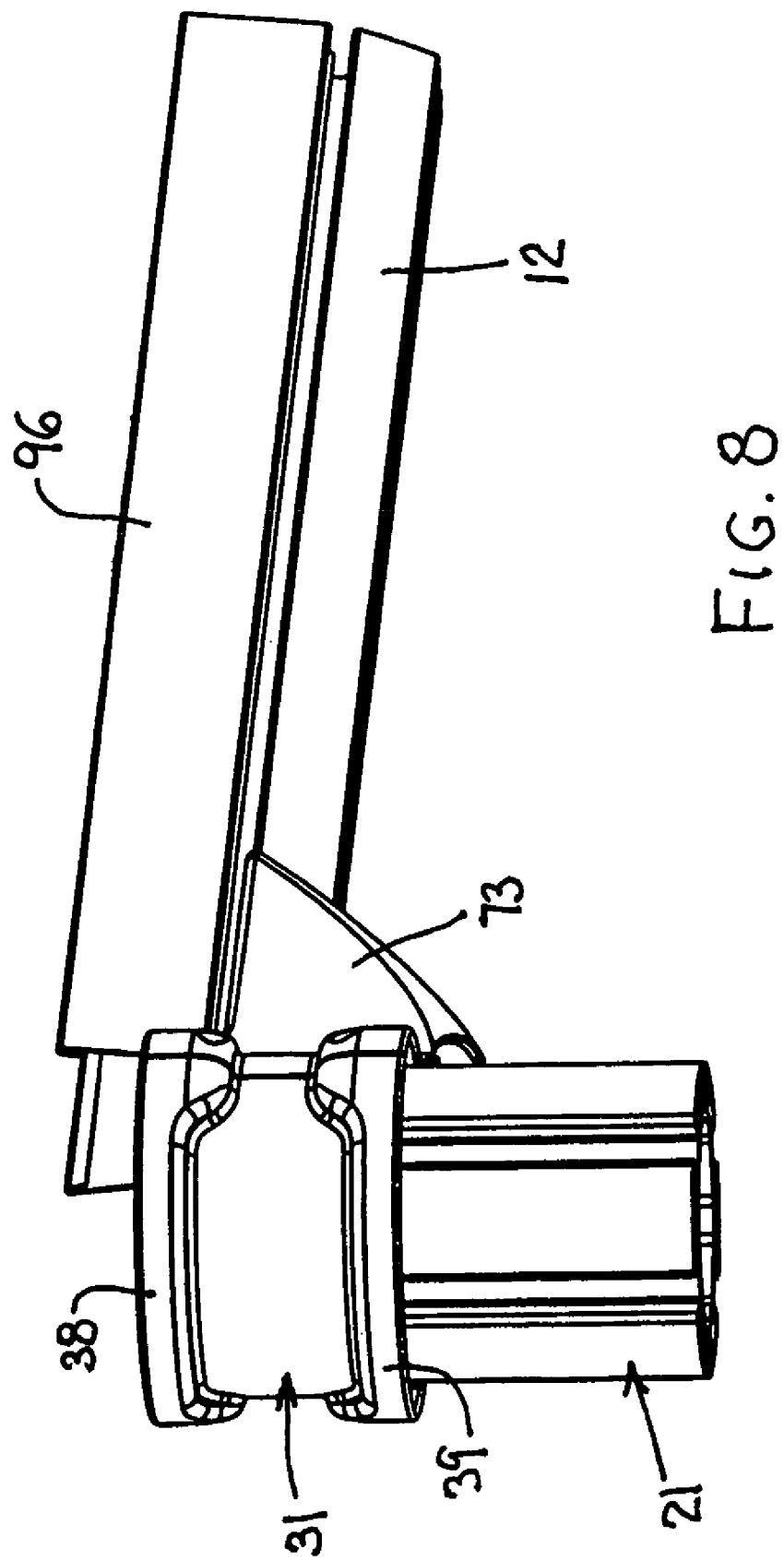
FIG. 8 illustrates the post mounting thereon a clamping collar and its engagement with the jaw assembly carried on a beam.

The mounting body 62 also has a pair of side shrouds 73 (only one shroud illustrated in FIG. 6) fixedly joined adjacent opposite sides thereof and projecting outwardly so as to accommodate one end of an elongate beam therebetween, such as the beam 12 illustrated in FIGS. 7-8.

The jaw assembly 61 also includes a second jaw 76 which is movable relative to the first jaw 63 and cooperates therewith to define a gripping relationship therebetween. This second jaw 76, which in the arrangement illustrated by FIG. 6, is herein referred to as a bottom jaw, is wholly separable from the mounting body 62 which carries the top jaw 63 thereon. The bottom jaw 76 along one edge thereof defines a jaw part 78 which is generally U-shaped in cross section and defines therein an upwardly opening gripping channel or groove 79. This jaw part 78 and its associated gripping channel 79 is elongated transversely and, when viewed vertically, have an arcuate configuration which is substantially identical to the arcuate configuration associated with the top jaw part, whereby the gripping channel 79 accommodates therein the generally cylindrical edge flange 38 or 39 associated with the connecting collar 31.

The bottom jaw 76, along the edge thereof which is opposite the jaw part 78, is provided with a transversely elongated key or projection 77 which protrudes upwardly and is sized so as to snugly fit into the downwardly-opening channel 72 provided on the lower side of the mounting body 62. The key 77 and its transverse elongation hence cause the key to extend approximately parallel with the elongate direction of the jaw part 78, ignoring the gradual curvature of the jaw part.

In the region between the gripping channel 79 and the upwardly-protruding key 77, the bottom jaw 76 defines thereon a generally flat but upwardly-facing clamping surface 75, the latter being adapted to engage against the lower surface of the bottom wall 74 associated with the mounting body. A suitable fastener, such as a threaded bolt 82, projects upwardly through a central opening 83 formed in the lower jaw for engagement with a threaded part 84, such as a nut, which is fixed to the mounting body. Tightening of the threaded fastener 82 hence enables the lower jaw 76 to be moved upwardly toward a position of snug engagement with the mounting body, and results in the lower flange 39 being snugly seated in the gripping channel 79. During the upward securement of the lower jaw relative to the mounting body, the upwardly projecting key 77 is similarly moved upwardly into and seated within the channel 72 provided on the mounting body, whereby the engagement of the key 77 within the channel 72 effectively acts as a horizontal fulcrum which permits the lower jaw to slightly vertically pivot during tightening of the fastener 82 so as to ensure that the respective upper and lower flanges 38 and 39 are properly seated within the respective top and bottom clamping channels 65 and 79 when the jaw assembly is mounted on and tightened for gripping engagement with the connecting collar.

To rigidly affix the jaw assembly 61 to a suitable furniture or furnishing component for attachment to the post, such component typically being a potential load-bearing component such as the elongate beam 12, the mounting body 61 has a plurality (four in the illustrated embodiment) of openings 86 extending therethrough from the front face 66, which openings accommodate therein elongated fasteners 87 such as screws or bolts. These fasteners 87, when inserted through the openings 86, align with openings 88 formed in the end of the beam 12 as illustrated by FIG. 7 so as to fixedly secure the mounting body 62 to the beam end. When so secured, the jaw assembly can then be coupled to the connecting collar 31 as secured to the upright post 21. When utilized with elongate beams, the beam is typically provided with a jaw assembly fixedly mounted on opposite ends thereof so that the beam can be positioned to extend horizontally between and supportingly joined to connecting collars associated with a pair of sidewardly-spaced upright post 21 substantially as illustrated by FIG. 1.

While the beam 12 may have many different structural and configurational features, depending upon the desired application, the beam 12 in the illustrated embodiment defines therein a pair of sidewardly-spaced upper channels 91 (FIG. 7) extending longitudinally throughout the length thereof. Each of these channels 91 is accessible through a slot-like opening 92 which communicates generally with the top of the channel throughout the length thereof. The illustrated beam 12 also has a lower channel 93 extending lengthwise of the beam, which channel 93 is substantially closed except for openings provided at opposite ends of the beam. In addition, the beam 12 has a bottom channel 94 which is defined generally below the lower closed channel 93, and which extends lengthwise of the beam and opens downwardly. The channel 94 is suitable for accommodating a longitudinally extending horizontal edge of a divider panel 14 (FIG. 1), such as a rigid panel or a flexible screen or curtain. Other objects such as hangers or the like can also be inserted into and clamped within the bottom channel 94 to permit other objects to be joined to and suspended downwardly from the beam when the latter is in the orientation illustrated by FIG. 7.

In addition, an auxiliary top beam 96 (FIG. 7) can also be provided, which beam in the illustrated embodiment is of an upwardly-opening channel-shaped cross section having a bottom wall shaped to permit it to be securely seated on top of the beam 12. Appropriate fasteners 97 such as screws or the like can be provided to secure the bottom wall of top beam 96 to the lower beam 12.

The beam 12 is particularly suitable for permitting cabling to be disposed therein and extend horizontally therealong. For example, communication cables or low-voltage electrical cables can be readily disposed within the upper channels 91. Higher voltage cables can be more readily handled by feeding them through the closed lower channel 93. Alternately, cables including primary power cables can also be laid into the top beam 96 (if utilized) and extend lengthwise therealong.

With the arrangement 10 of the present invention as illustrated by FIG. 1, and in particular when utilizing the improved post-and-beam arrangement as depicted by FIGS. 2-8, work stations within an office environment can be easily assembled and configured while providing a wide variety of shapes and functionality, and in particular semi-private and reconfigurable spaces can be easily and readily provided without the need for permanent wall panels, and at the same time the reconfigurable walls defined by the inventive arrangement enable workspaces to be readily defined which provide increased flexibility with respect to configuration and orientation as well as openness.

To dissemble the arrangement, the collars 31 are secured to the upright posts at desired axial locations therealong, such as adjacent upper and lower ends thereof when assembled in a manner as illustrated by FIG. 1. The jaw assemblies as fixed to opposite ends of the beam are then joined to and clampingly engaged with the connecting collars at any desired angular orientation relative to the centerline of the post. For example, when connecting an upper beam to an upper collar, the upper jaw is effectively hooked over the top flange and the lower jaw is then moved upwardly to effectively hook around the lower flange. After the beam has been angularly moved into the desired angular orientation relative to the post, then the lower jaw is sufficiently tightened so that the opposed flanges 38-39 on the connecting collar are rigidly clampingly engaged within the upper and lower clamping channels defined by the opposed jaws. If the beam is to be disposed at a lower elevation such as depicted in FIG. 1, then the same beam 12 and attached jaw assembly 61 can be provided and secured to the lower collar, although in this situation the beam and clamping jaw can be vertically inverted so that the moving jaw is now uppermost, and the bottom channel 94 in the beam 12 now faces upwardly, thereby permitting a screen or panel member to extend vertically between and have the upper and lower edges confined by the top and bottom beams.

Figure 9:
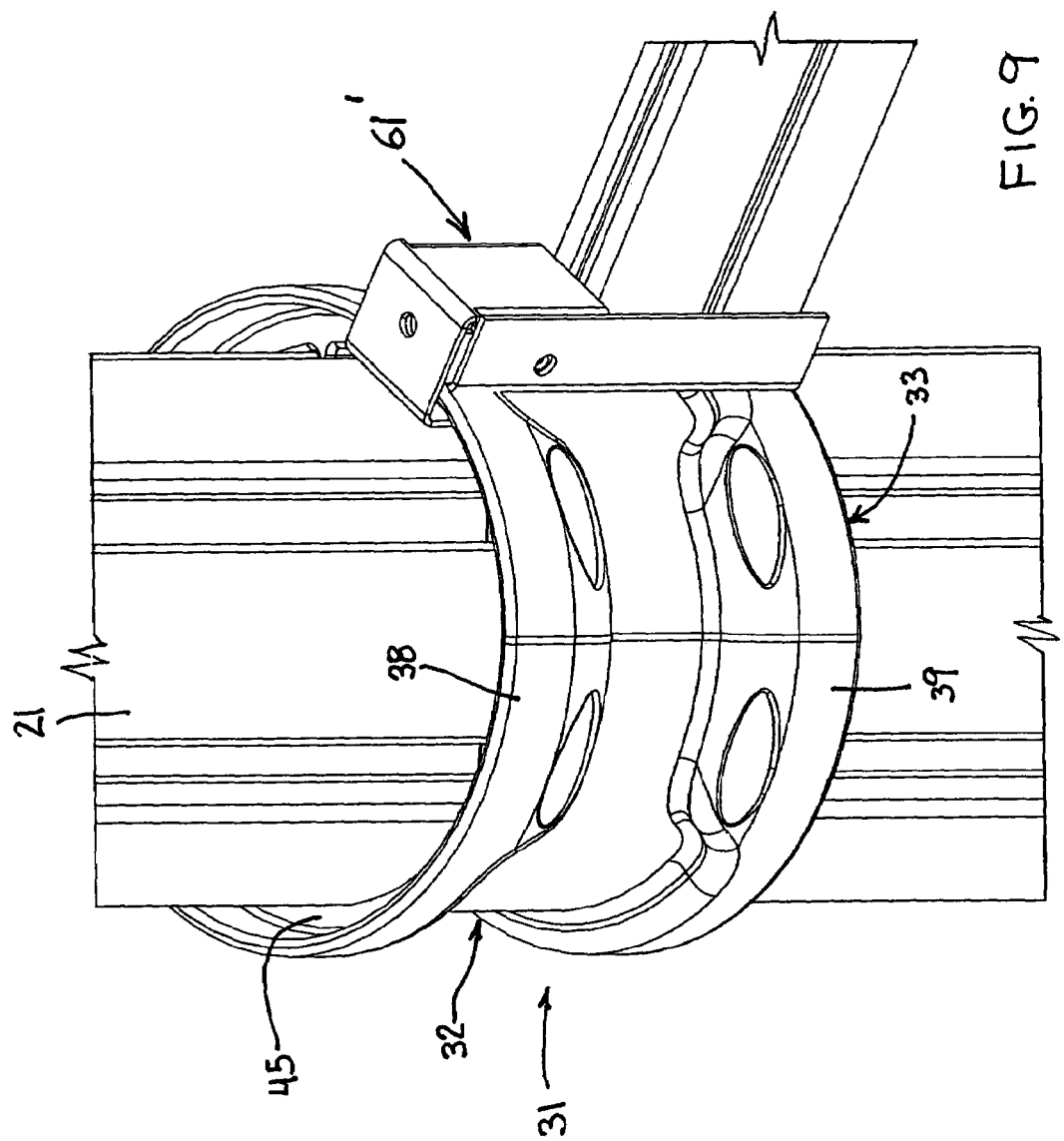
FIG. 9 is a fragmentary perspective view which illustrates the clamping collar engaged around the beam, and its cooperation with a modified jaw assembly.

Alternatively, the beam can be provided with a simplified jaw arrangement 61' (FIG. 9) fixedly mounted on the end of the beam. This jaw arrangement 61' is basically the same as the jaw arrangement 61 except that it is simplified by eliminating the large side shrouds 73.

With the invention as briefly summarized above, electrical cables can be readily fit vertically through the interior passage 29 defined within the hollow post 21, and can also be fed along the top beams 29 (if utilized). Communication or low-voltage electrical cables can also be fed along the beams through the channels 91, with the cables exiting the beams and passing under the shrouds so as to then be fed vertically downwardly of the post 21 along the flutes or channels 23 for connection to suitable electronic or electrical devices disposed adjacent the arrangement or in the adjacent workspace. Alternatively, or in addition, the lower beam can also be used for transmission of communication and/or electrical cables, which cables can be run vertically of the post 21 in the manner described generally above.

With the aforementioned arrangement, load-bearing components such as beams can be supported on and project radially outwardly from the post 21 at any desired angular orientation relative to the circumference of the post, thereby greatly increasing positional flexibility and functionality, without being restricted to discrete angular intervals such as is typically conventional. At the same time the connecting collar 31 can be secured at virtually any axial position along the post, thereby effectively providing infinite height selectability and adjustability, thereby again providing a significantly higher degree of orientation and functional flexibility than can be achieved by typical systems which provide height adjustability only at discrete predefined intervals or locations.

Figure 10:
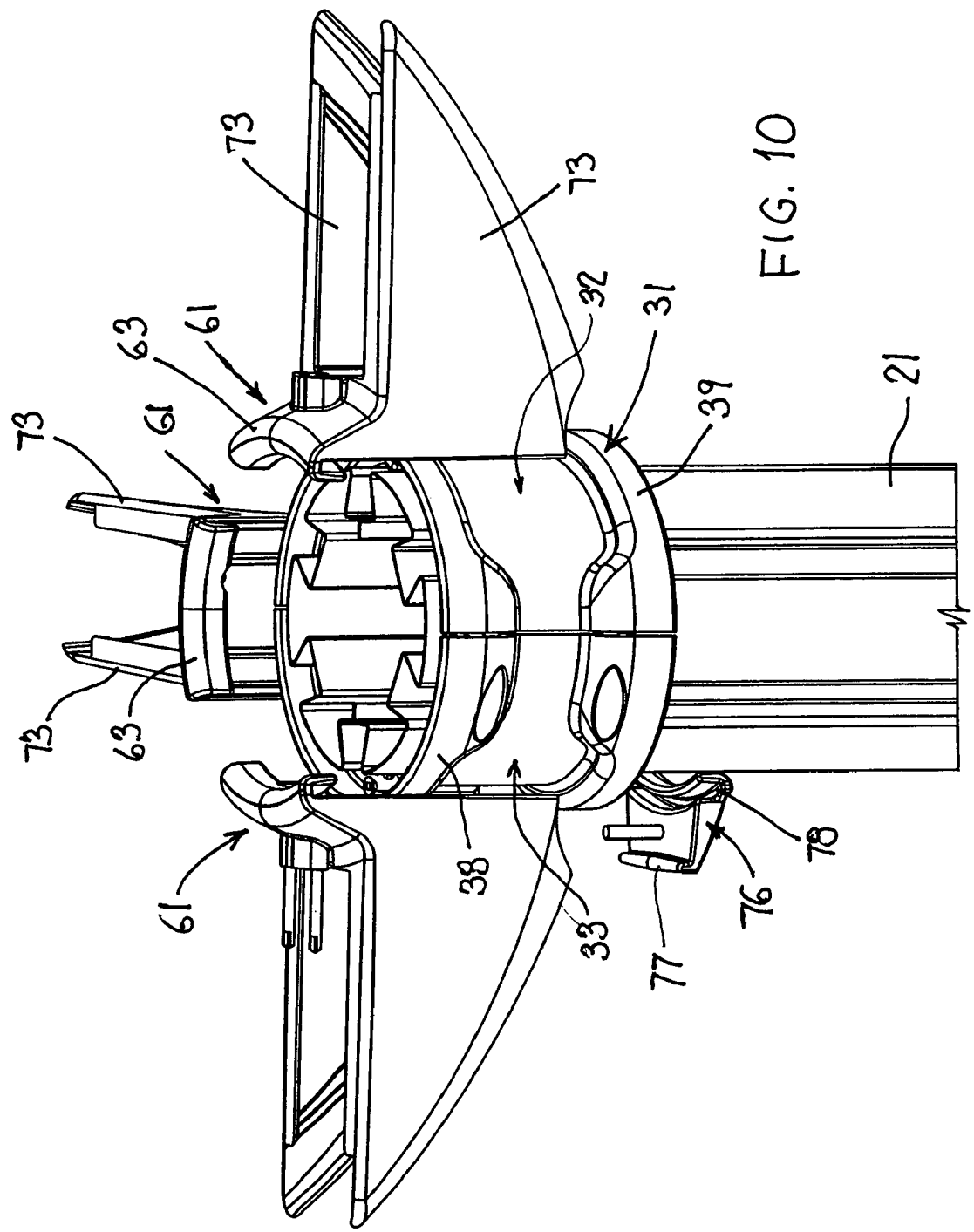
FIG. 10 is a fragmentary perspective view which illustrates a post with the clamping collar thereon, and the collar cooperating with three jaw assemblies prior to their securement to the clamping collar.

The post-and-collar arrangement of this invention, as described above, is also desirable for permitting several members, such as beams 12, to be connected thereto at variable angular spacing therearound. In this regard, attention is directed to FIGS. 10-11 which illustrate a post 21 having a connecting collar 31 secured thereto adjacent an upper end of the post, which collar is illustrated as cooperating with three jaw assemblies each cooperating with one end of an elongate beam 12. Each of the jaw assemblies 61 is independently engagable with or disengagable from the collar 31 at any location around the perimeter of the top and bottom flanges 38-39, subject to the clamping jaws being disposed so as to not contact or interfere with the other clamping jaws already engaged with the connecting collar. This hence provides a high degree of flexibility with respect to the angular orientation of any or all of the beams as they radiate outwardly from the post. Further, after the upper and lower jaws have been relatively moved toward one another so as to respectively embrace the upper and lower flanges of the connecting collar, but prior to final tightening of the jaws, the jaw can be slidably moved circumferentially around the collar flanges so as to permit final and more precise positioning of the jaw assembly, prior to final tightening and securing thereof to the collar. This hence greatly facilitates assembly, or reorientation, of the arrangement.

The post 21 of the present invention also cooperates with a modified clamping arrangement 101 (FIGS. 12-14) which mounts on the post at a desired position therealong so as to permit other auxiliary equipment, such as the panel 16 illustrated in FIG. 1, to be mounted thereon.

The clamping arrangement 101 includes a clamping assembly 102 which fixedly but removably mounts onto the post 21 and is disposed so as to extend partially around the exterior periphery thereof. The clamping assembly 102 in turn mounts thereon a jaw assembly 103 which in turn connects to a suitable furniture or furnishings component such as the flat panel 16 (FIG. 1).

The clamping assembly 102 is defined by a pair of clamping parts 106 and 107 which cooperate to define an arcuate sector for clampingly engaging the post 21 and for extending around the cylindrical periphery thereof through an angular extent which is significantly less than 360°, and in fact is typically less than 180°. The clamping parts 106 and 107 are preferably identical to one another, with the part 107 being vertically rotated 180° relative to the part 106.

Each of the clamping parts 106 and 107 includes a main body 108 which is defined generally by an arcuate sector of a sleeve, and defines thereon an arcuate inner wall 109 which is configured to be generally compatible and engagable with the exterior cylindrical wall 22 of the post 21. This main body 108 has an outer wall 111 which is of a generally arcuate profile. The outer wall 111 defines top and bottom flanges 112 and 113 which extend along the arcuate upper and lower extent of the outer wall and respectively project axially upwardly and downwardly to define rims which generally correspond to the rims or flanges 38-39 associated with the connecting collar 31 as described above. The top and bottom flanges or rims 112-113, when the clamping assembly 102 is secured to the post 21, are generally concentric with but spaced radially outwardly a small distance from the exterior cylindrical periphery 22 of the post so as to define arcuate grooves or recesses 114 which are defined between the post and the clamping rims adjacent the axially upper and lower ends of the clamping assembly 102. Each clamping part 106-107 also has a key or projection 116 which is joined to and is cantilevered radially inwardly from the inner wall 109. This key 116 is adapted to project into one of the flutes or grooves 23, and the one side wall 117 (FIG. 12) of the key extends radially inwardly at an acute angle relative to a radial direction so that the side wall 117 has an angled relationship whereby it extends generally parallel to and hence can be moved into generally flat gripping engagement with an opposed side wall 25 or 26 of the engaged flute 23.

Each clamping part 106-107 also has a generally flat end surface 118 formed thereon which faces and is generally parallel to the opposed flat end surface formed on the other clamping part. This end surface 118 has a block-like key 121 projecting outwardly therefrom, which key 121 is disposed directly adjacent a similar shaped recess 122 which is formed inwardly from the surface 118. The key 121 and recess 122 as associated with the clamping part 107 respectively engage a corresponding recess and key associated with the end surface of the other clamping part 106 when the two parts are clamped together in end-to-end relationship as illustrated by FIGS. 12-13.

To couple the clamping parts 106-107 together in end-to-end relationship and hence define a substantially continuous arcuate wall, each sector has a pair of openings 124 and 125 which extend therethrough and which open through the end surface 118. The one opening 124 as associated with each sector enables a threaded fastener such as a bolt or screw 123 to extend therethrough for cooperation with the opposed opening 125 formed in the other clamping part, the latter opening 125 typically being threaded so as to engage the fastener 123. The fasteners 123, one being inserted through the connecting part 106, the other inserted through the other connecting part 107. hence effectively draw the connecting parts 106-107 together so that the opposed end surfaces 118 closely approach one another, causing the keys 116 as positioned within an adjacent pair of flutes 23 (FIG. 12) to be drawn toward one another and moved into gripping engagement with the side walls 25-26 as defined on the adjacent flutes 23. Since the engaged side walls 25-26 extend in a converged angled relationship to one another as they project radially inwardly, the tightening of the fasteners 123 and the engagement of the key surfaces 117 against the side walls 25-26 causes the assembled clamping parts 106-107 to be drawn radially inwardly so as to effect a very snug and fixed securement of the clamping assembly 102 to the periphery of the post 21.

As to the jaw assembly 103 which cooperates with the clamping assembly 102, this assembly 103 structurally and functionally cooperates in substantially the same manner as described above relative to jaw assembly 61.

More specifically, the jaw assembly 103 includes a first or top jaw 131 defined by a generally block-like mounting body 132 which defines a surface 133 on one side thereof which is configured so as to oppose but closely conform to the opposed outer wall 111 when the top jaw is mounted on the clamping assembly. This top jaw 131 includes a jaw part 134 associated with an upper edge of the block-like body 132 and which protrudes outwardly beyond the surface 133 so as to protrude radially inwardly toward the post 21. This protruding jaw part 134 defines therein a downwardly opening clamping groove or channel 135 which is elongated in that it extends horizontally across the width or transverse dimension of the top jaw. This clamping channel 135, as well as the downwardly protruding outer side leg which defines one side of the channel, is defined with an arcuate configuration which generally corresponds to the arcuate configuration of the clamping collar rim 112, 113 so that the clamping groove 135 will snugly accommodate therein the top or bottom flange 112-113 of the clamping assembly, whereby the outer leg of the jaw part will protrude into the associated arcuate groove or recess 114 as defined between the post and the adjacent rim 112-113.

Jaw assembly 103 also includes a second or lower jaw 136 defined by a body 137 having a lower jaw part 138 protruding radially inwardly therefrom. This lower jaw part 138 is configured generally the same as the upper jaw part 134 and defines therein an upwardly oriented gripping channel or groove 139 which is configured like the upper channel 135 so as to enable the rim or flange 112-113 of the clamping subassembly to be snugly seated therein.

The upper and lower jaws 131 and 136 are coupled by an appropriate fastener 141, such as a screw, which protrudes upwardly through an opening 142 in the lower jaw 136 and is threadedly engaged with the upper jaw 131 so that the jaws can be moved toward one another to hence cause the upper and lower clamping rims 112 and 113 to be respectively moved into snug clamping engagement within the opposed clamping channels 135 and 139.

The body 132 associated with the top jaw 131 also has a plurality of openings 143 formed therein, which openings cooperate in a conventional manner with threaded fasteners which enable the body of top jaw 131 to be fixedly secured to an accessory or structural article which is to be secured to the periphery of the post, which object may comprise one end of a beam similar to that as discussed above, or may comprise an article which is effectively supported solely from a single post, such as the display 16 shown in FIG. 1. The securement of the article or object to the jaw 131 may involve any known conventional fastening technique, and further detailed description thereof is believed unnecessary.

When the jaw arrangement 103 is mounted on the clamping assembly 102 as illustrated by FIG. 12, the jaw assembly can be secured to the arcuate clamping segment defined by the joined clamping parts 106-107 at any location throughout the elongate arcuate extent of the rims 112-113 thereof. This is diagrammatically illustrated in FIG. 12 which, in addition to the solid-line showing of the jaw assembly 131, also illustrates that this jaw assembly can be moved so as to be disposed in end positions disposed adjacent opposite ends of the arcuate clamping collar substantially as illustrated by the partial dotted-line illustration of the jaw arrangement 103. The jaw arrangement 103 can hence be disposed at any location defined generally between the two end positions depicted by the dotted-line representations in FIG. 12, thereby providing significant angular orientation and adjustability with respect to the article which is being secured to the post.

In addition, the modified clamping assembly 102 of FIGS. 12-14 is desirable in that it can be readily applied to and used on the post 21 at a wide variety of locations both axially and circumferentially thereof, and can easily be mounted to or removed from the post without interfering with other equipment or structures mounted on or positioned adjacent to the post inasmuch as the clamping subassembly 102 extends through an angular extent which only partially surrounds the post. In this respect, the angular extent of the clamping assembly 102 is normally 180° or less, and in fact in the illustrated and preferred embodiment the angular extent of the clamping assembly 102 is about 120°. With this angular arrangement, and the fact that the coupling keys 116 cooperate with only an adjacent pair of post flutes 23, this hence enables three such clamping assemblies 102 to be mounted angularly so as to encircle the post at substantially the same or at least similar elevations, thereby optimizing flexibility with respect to when such clamping assemblies are mounted on or removed from the post, as well as flexibility with respect to the exact position of the assembly axially of the post, and the disposition of the accessory or component which secures to the associated jaw system.

As illustrated by FIG. 12, the post 21 can be readily provided with one or more retainer clips 151 disposed for resilient engagement within the flutes 23 at selected locations axially therealong to assist in accommodating cabling or the like within the flutes. The clip 151 is formed generally as an open U-shaped member shaped from a springy or resilient sheet-like material, such as metal or plastic, and the cantilevered legs 152 are suitably V-shaped so that they can be resiliently sprung inwardly toward one another to permit insertion into the flute 23, with the resiliency of the legs 152 and the shape thereof enabling them to spring out into gripping engagement whereby the legs effectively conform to the opposed sloped sides of the flute and effectively engage the outer corners of the flute.

Figure 15:
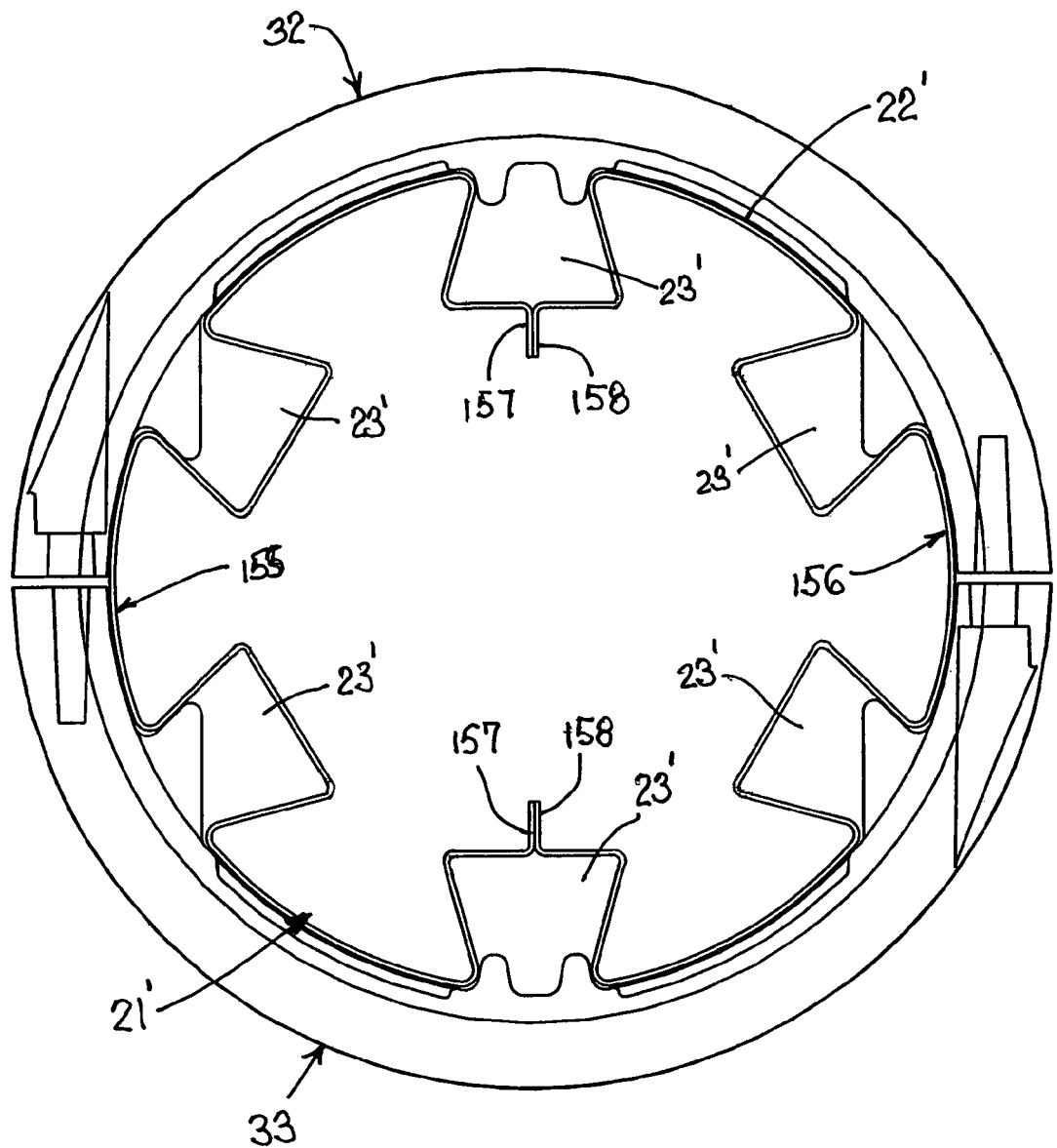
FIG. 15 is a view which generally corresponds to FIG. 4 but illustrates a modified construction of the post.

The post 21 as illustrated and described above can be formed utilizing any conventional manufacturing technique, such as by being extruded of aluminum so as to be defined by a one-piece monolithic structure. Alternately, however, the post can be fabricated from multiple pieces, and reference is made to FIG. 15 which generally corresponds to FIG. 4 but illustrates a modified post 21' therein. Post 21' generally corresponds to the post 21 described above except that Post 21' is initially formed by two substantially identical post sectors 155 and 156, each being substantially semi-cylindrical and having a plurality of flutes 23 formed axially therealong. These post sectors 155-156 have respective coplanar edge flange 157 and 158 associated with the opposite longitudinally extending edges thereof, which flanges are appropriately overlapped and fixedly secured together in a conventional manner so as to unite the post sectors 155 and 156 into a one-piece substantially cylindrical post. The post 21', formed by this construction technique, hence does not have a complete inner annular wall equivalent to the wall 28 associated with the post 21, but such wall is not required.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A space-dividing post-and-beam arrangement for at least partially defining interior workspaces, comprising:

a plurality of vertically elongate, upright posts disposed in sidewardly-spaced supportive upright engagement with a floor, each said post being generally circular in cross section and having a plurality of channel-like grooves formed therein and extending axially therealong in angularly spaced relationship around a post circumference;

a ring-shaped clamping collar fixedly but removably engaged in encircling relationship on each of first and second said posts which are disposed in sidewardly-spaced relationship from one another;

said clamping collar being defined by a pair of arcuate collar segments which when coupled in opposed relationship define said collar, said arcuate segments being relatively movable into an open or separated position to enable mounting around or removal from the post, and fasteners cooperating between opposed ends of the arcuate collar segments for rigidly coupling the collar segments together in encircling engagement with the post such that said collar segments clamp onto said post to prevent vertical displacement of said clamping collar along said post, each said collar segment having a pair of positioning keys projecting radially inwardly thereof in circumferentially spaced, non-movable relationship from one another and disposed for insertion within different ones of said channel-like grooves when the clamping collar is mounted on the post wherein said positioning keys circumferentially locate and prevent circumferential movement of said collar segments relative to said post;

each of said collar segments having top and bottom rims which respectively project axially upwardly and downwardly and extend length-wise along the collar segment throughout the arcuate extent thereof, said rims defining on one side thereof an inner arcuate wall which is generated on a radius slightly greater than the radius defining an exterior diameter of the post so as to define a narrow clearance groove between the rim and the post, said groove defining a substantially complete annulus which externally surrounds the post and is defined between the post and the rims when the connecting collar is mounted on the post;

a horizontally elongate beam having jaw assemblies fixedly but removably mounted on opposite ends thereof, said jaw assemblies being respectively fixedly but removably coupled to the connecting collars associated with said first and second posts so as to rigidly connect said beam to and between said posts;

said jaw assembly having a support body rigidly joined to the beam and which mounts a first outwardly-protruding jaw part, and a second outwardly-protruding jaw part being movably mounted on said body and disposed in generally vertically opposed relationship to said first jaw part, said first and second jaw parts defining therein vertically opposed clamping grooves which have a horizontally elongate and arcuate shape so that the uppermost jaw part hooks downwardly over the top rim and the lowermost jaw part hooks upwardly over the bottom rim, and a tightening arrangement cooperating between the jaw parts for relatively moving them vertically toward one another to fixedly clampingly engage the top and bottom rims within the respective top and bottom clamping grooves;

said clamping grooves and their cooperation with the rims on said connecting collar permitting the jaw assembly to be mounted at any desired location circumferentially around the post.

2. A post-and-beam arrangement according to claim 1, wherein the channel-like groove as formed in the post is defined between opposed sidewalls which diverge with respect to one another as they project radially inwardly and which individually extend in angled relation to a radial direction, and wherein the sidewardly-spaced pair of positioning keys have outer side surfaces which face outwardly away from each other and define substantially intersecting planes, each of said opposed outer side surfaces being engaged with a respective one of the side walls of the respective channel-like grooves to locate said collar segment circumferentially relative to said post.

3. A post-and-beam arrangement according to claim 2, wherein each said collar segment has a third positioning key provided thereon and projecting radially inwardly thereof, said third positioning key being positioned generally midway between said sidewardly-spaced pair of positioning keys and being engaged with a still different one of said channel-like grooves.

4. A post-and-beam arrangement according to claim 2, wherein said opposing outer side surfaces are oriented transverse to an outer circumference of said post so as to lie flat against said respective side walls of said respective channel-like grooves with which said outer side surfaces are engaged, each of said positioning keys having an inner side surface which converges radially inwardly toward said outer side surface to define an apex therebetween and also extending radially outwardly from said groove.

5. A post-and-beam arrangement according to claim 4, wherein said pair of said positioning keys on each said collar segment define first and second said positioning keys which are disposed proximate first and second said ends of said respective collar segment, said first keys on said first ends of said pair of said collar segments being circumferentially spaced apart and disposed in different said grooves so as to clamp a first circumferential segment of said post circumference therebetween, and said second keys on said second ends of said pair of said collar segments being circumferentially spaced apart and disposed in different said grooves so as to clamp a second circumferential segment of said post circumference therebetween.

6. A post-and-beam arrangement according to claim 1, wherein the collar segments are substantially identical and each is defined by a substantially semi-cylindrical collar part which at opposite arcuate ends terminates in generally coplanar end surfaces, and threaded fasteners cooperating between opposed end portions of said collar parts and extending through the flat end surfaces defined at both ends of the opposed collar parts for rigidly joining the collar parts together in external surrounding relationship to the post.

7. An upright post arrangement for use in an interior office environment, comprising:
a vertically elongate upright post having a lower end supported on a floor;
said post being defined by a generally hollow cylindrical member having a plurality of channel-like grooves formed radially inwardly from the outer periphery thereof with said grooves extending axially throughout substantially the full length of the post and being disposed in angularly spaced relationship around the post;
a ring-shaped clamping collar disposed in encircling relationship to the post and fixedly engaged therewith at a selected axial location along the post, said clamping collar having an axially intermediate portion which substantially encircles the post and defines thereon surface areas generated on a cylindrical profile which substantially corresponds to the outer cylindrical surface of said post for substantial clamping engagement therebetween when the clamping collar is engaged exteriorly around the post;
said clamping collar also including upper and lower axial end portions which are disposed axially on opposite sides of said intermediate portion, each said axial end portion including a substantially annular flange which projects axially so as to terminate at an outer free end and which is disposed in surrounding and concentric relationship to the exterior periphery of the post but is spaced radially outwardly therefrom by a small radial distance so as to define an annular clearance groove therebetween which opens axially away from the intermediate portion;
said clamping collar being defined by a pair of substantially semi-cylindrical collar segments which are disposed in generally opposed relation with opposed ends of said collar segments being joined together through fasteners to effect gripping of the collar to the post when the collar is disposed so as to exteriorly surround the post;
each said collar segment having a non-movable key part fixed thereto in a stationary position and protruding radially inwardly beyond the cylindrical surface area, said key part being engaged within one of the channel-like grooves associated with the post when the collar segments are secured together in surrounding relationship thereto so as to circumferentially locate said collar segment on said post;
a component positioned exteriorly adjacent to said post and having a jaw structure carried thereon for fixed but releasable engagement with the collar on said post;
said jaw structure including upper and lower jaws defining respectively opposed upper and lower jaw parts, said upper and jaw parts respectively defining therein vertically opposed downwardly-facing and upwardly-facing clamping channels which are horizontally elongated and shaped for effecting clamping engagement with the respective upper and lower rims on said clamping collar, said jaws and their cooperation with the respective annular rim on the clamping collar permitting the jaw to be positioned at substantially any desired angular orientation relative to the surrounding circumference of the post, and an adjustable securing structure cooperating between the opposed upper and lower jaws for effecting relative vertical movement therebetween to simultaneously rigidly clamp the upper and lower rims of the collar within the respective upper and lower clamping channels;
each of said substantially semi-cylindrical collar segments having substantially semi-cylindrical rim parts which protrude axially upwardly and axially downwardly from the respective upper and lower edges thereof, the rim parts on said collar segments cooperating to define said annular rims when the semi-cylindrical collar segments are fixedly engaged in encircling relationship to the post.

8. A post assembly according to claim 7, wherein each said collar segment has a pair of said keys disposed in said respective stationary positions in circumferentially spaced relationship and projecting radially inwardly from the inner cylindrical surface thereof, said keys being sidewardly angularly spaced so as to individually project into different ones of said channel-like grooves in said post, said keys defining thereon inner side surfaces which are disposed on generally opposed inner sides thereof but define a converging angled relationship therebetween as the keys project radially inwardly toward the post, and said side surfaces on said keys being respectively engaged with side walls associated with the respective channel-like grooves for creating a clamping engagement between the collar segment and the post when said collar segments are joined together by said fasteners.

9. A post arrangement according to claim 8, wherein each channel-like groove as it opens radially inwardly of the post is defined between opposite side walls which diverge in angled relationship to one another as they project toward the bottom of the groove.

10. A post arrangement according to claim 9, wherein each said collar segment has first, second and third key structures each defined by a said key part which project radially inwardly thereof beyond a partial inner cylindrical surface of the segment, said first key structure being engaged in and occupying substantially the full width of a first said channel-like groove, said second and third key structures being disposed in sidewardly spaced relationship on said collar segment with said first key structure being dispositioned substantially midway therebetween, said second and third key structures being positioned within respective second and third said channel-like grooves which are disposed in uniformly angularly spaced relationship on opposite sides of said first channel-like groove, each of said second and third key structures being engaged principally with only one of the side walls of its respective groove.

11. A post-and-beam arrangement according to claim 7, wherein said positioning key on each said collar segment defines a first said positioning key which is disposed proximate a first said end of said respective collar segment, said first keys on said first ends of said pair of said collar segments being circumferentially spaced apart and disposed in different said grooves so as to be drawn circumferentially together by said fasteners and clamp a first circumferential segment of said post circumference therebetween.

12. A post-and-beam arrangement according to claim 11, wherein each said collar segment includes a second said positioning key disposed proximate a second said end of said respective collar segment, said second keys on said second ends of said pair of said collar segments being circumferentially spaced apart and disposed in different said grooves so as to be drawn circumferentially together by said fasteners and clamp a second circumferential segment of said post circumference therebetween.

13. A post-and-beam arrangement according to claim 12, wherein said first and second circumferential segments are disposed on diametrically opposite sides of said post.

14. An upright post arrangement for use in conjunction with an interior work space, comprising:
a vertically-elongate upright post disposed in upright supportive engagement with a floor, said post being defined as a hollow cylinder having a plurality of channel-like grooves opening radially inwardly from an outer cylindrical peripheral surface of the post, said grooves extending axially along the length of the post and being disposed in angularly spaced relationship therearound;
a clamping arrangement fixedly but releasably engaged with said post at any axial location therealong, said clamping arrangement including an arcuate collar segment which extends circumferentially around the exterior of the post through an angular extent of no more than 180°, said collar segment being defined by two arcuate collar parts having opposed ends rigidly join together by fasteners so as to form said collar segment;
said collar segment including a pair of circumferentially spaced securing keys projecting radially inwardly from an inner peripheral surface thereof so that each said key projects into and engages a side wall of a different one of said grooves, each said securing key being disposed non-movably in a stationary position on a respective said collar part whereby said collar parts when drawn together in end-to-end relationship cause said securing keys to be drawn toward one another for engaging oppositely-oriented side walls of said different ones of said grooves to effect clamping engagement with said post;
said collar segment having top and bottom rims which extend lengthwise therealong and which are respectively cantilevered upwardly and downwardly, each of said ribs being generally concentric with and spaced radially outwardly a small distance from the adjacent outer cylindrical surface of the post so as to define a narrow clearance slot therebetween; and
a jaw-type clamping structure fixedly but releasably engaged with said clamping arrangement, said jaw-type clamping structure including vertically opposed first and second jaw parts which respectively define therein downwardly and upwardly facing clamping channels having a horizontally elongate arcuate configuration corresponding to the configuration of the rims on said collar segment, said first and second jaw parts being respectively hooked over the top and bottom rims at any desired angular location throughout the length of the rims so that the top and bottom rims are respectively disposed within the downwardly and upwardly facing clamping channels, and an adjustable securing means connected between said first and second jaw parts for relatively urging the jaw parts toward one another to stationarily and fixedly clampingly engage the top and bottom rims with the respective top and bottom jaw parts.

15. A post arrangement according to claim 14, wherein said two arcuate collar parts are identical.

16. A post arrangement according to claim 14, wherein said collar segment extends circumferentially through an angle of about 120°, and wherein said pair of key structures are respectively engaged within a circumferentially adjacent pair of said channel-like grooves.

17. A post arrangement according to claim 15, wherein the pair of arcuate collar parts are identical except that one said collar part is vertically rotated 180° relative to the other collar part when the collar parts are connected together in end-to-end relationship, said collar parts defining thereon at said adjacent ends opposed flat end surfaces which are generally parallel, each of said end surfaces having an outwardly projecting key positioned adjacent an inwardly projecting recess, whereby the key and recess on one of the end surfaces are respectively engaged with the recess and key associated with the opposed end surface when the arcuate collar parts are joined end to end.

18. A post arrangement according to claim 17, including a threaded fastener arrangement extending through the adjacent opposed end surfaces and joined to the collar parts for rigidly securing them together.

* * * * *